(12) United States Patent
Theimer et al.

(10) Patent No.: US 8,237,559 B2
(45) Date of Patent: *Aug. 7, 2012

(54) METHODS, DEVICE AND SYSTEM FOR SENDING AND PROVIDING ENVIRONMENTAL DATA

(75) Inventors: Wolfgang Theimer, Bochum (DE); Thomas Schetelig, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,335

(22) Filed: Feb. 7, 2011

(65) Prior Publication Data
US 2011/0130156 A1  Jun. 2, 2011

Related U.S. Application Data

(63) Continuation of application No. 11/886,066, filed as application No. PCT/IB2005/000649 on Mar. 15, 2005, now Pat. No. 7,889,071.

(51) Int. Cl.
*G08B 1/08* (2006.01)
(52) U.S. Cl. .......... 340/539.13; 340/539.26; 340/539.28
(58) Field of Classification Search ............ 340/539.13, 340/539.1, 539.11, 539.26, 539.28
See application file for complete search history.

(56) References Cited

U.S. PATENT DOCUMENTS

| | | | | |
|---|---|---|---|---|
| 6,076,044 A * | 6/2000 | Brown | ............................ | 702/3 |
| 6,480,121 B1 * | 11/2002 | Reimann | ...................... | 340/990 |
| 6,728,552 B2 * | 4/2004 | Chatain | ...................... | 455/556.1 |
| 7,889,071 B2 * | 2/2011 | Theimer et al. | .......... | 340/539.13 |
| 2002/0090976 A1 * | 7/2002 | Chatain | .......................... | 455/556 |
| 2002/0119769 A1 * | 8/2002 | Heinonen et al. | .............. | 455/422 |
| 2008/0278313 A1 * | 11/2008 | Theimer et al. | .......... | 340/539.13 |

FOREIGN PATENT DOCUMENTS
EP  1 213 905 A2  6/2002

OTHER PUBLICATIONS

International Preliminary Report on Patentability for corresponding international application No. PCT/IB2005/000649 dated Sep. 18, 2007, pp. 1-7.
International search report and written opinion for corresponding international application No. PCT/IB2005/000649 dated Oct. 27, 2005, pp. 1-10.
Office action for related U.S. Appl. No. 11/886,066 dated Dec. 24, 2009, pp. 1-28.
Office action for related U.S. Appl. No. 11/886,066 dated May 14, 2010, pp. 1-26.
Office action for related U.S. Appl. No. 11/886,066 dated Oct. 5, 2010, pp. 1-9.

* cited by examiner

*Primary Examiner* — Travis Hunnings
(74) *Attorney, Agent, or Firm* — Ditthavong Mori & Steiner, P.C.

(57) ABSTRACT

The invention relates to a method for sending environmental data by means of a mobile terminal device, comprising the steps of detecting said environmental data, evaluating said environmental data, determining if said evaluated environmental data is to be sent, and sending said environmental data in case of an affirmative determination.

22 Claims, 4 Drawing Sheets

METHODS, DEVICE AND SYSTEM FOR SENDING AND PROVIDING ENVIRONMENTAL DATA

RELATED APPLICATIONS

This application is a continuation of U.S. application Ser. No. 11/886,066, filed on Feb. 6, 2008, which is a National Stage of International Application No. PCT/IB2005/00649, filed Mar. 15, 2005; which are incorporated herein by reference in their entireties.

The present invention relates to the field of sending and providing environmental data. More particularly the present invention relates to a method, device and system that overcomes the deficiencies of the state of the art Mobile terminals are becoming increasingly powerful in terms of processing and storage means, communication capabilities and environmental sensing possibilities. It will be common in the future to provide mobile terminals, like mobile phones, with sensing means (sensors) which are adapted to exactly record environmental data. For instance a mobile phone that is embedded in a car may determine by means of a rain/water sensor if it's raining. Said collected weather data may be sent to a service providing entity like a TV station, for instance.

Existing mobile devices that are enabled to send environmental data may cause some problems, because they may not be capable to decide if the sensed data may be sent or not. This means that said devices are continuously sending or they send only if the server side requires data.

An overall object of the present invention is to provide a method, device and system adapted for detecting and preferably recording and sending environmental data in an independent manner, so that network traffic or substantial influence from server side or a service providing entity may be avoided. Another object of the present invention is to provide arrangements and systems, which allow performing above stated methodology.

The objects of the present invention are solved by the subject matter defined in the accompanying independent claims.

According to an aspect of the present invention there is provided a method for sending environmental data by means of a mobile terminal device, comprising the steps of: detecting said environmental data; evaluating said environmental data; determining if said evaluated environmental data is to be sent; and sending said environmental data in case of an affirmative determination. Thereby environmental data such as data provided by sensors located in the close proximity of the mobile device can be detected, recorded, evaluated and sent on demand.

According to an aspect of the present invention there is provided a method, wherein said detecting is provided by means of a sensor within said mobile terminal device.

According to an aspect of the present invention there is provided a method, wherein said evaluating comprises statistical operations carried out on said environmental data.

According to an aspect of the present invention there is provided a method, wherein said determining is based on predetermined thresholds regarding said environmental data.

According to an aspect of the present invention there is provided a method, wherein said detected data is processed within a predetermined time period.

According to an aspect of the present invention there is provided a method, comprising the steps of: receiving environmental data from a plurality of environmental data providing entities, wherein said environmental data are associated with each of said entities accordingly; processing said received environmental data; and providing said processed environmental data.

According to an aspect of the present invention there is provided a method, wherein said receiving is provided on a time basis.

According to an aspect of the present invention there is provided a method, wherein said processing of said received environmental data further comprises a predictive operation on the basis of the continuously received data from said plurality of entities.

According to an aspect of the present invention there is provided a method, wherein said providing comprises sending of processed environmental data to certain receipts.

According to another aspect of the present invention there is provided a computer program product, comprising program code sections for carrying out the operations of anyone of the preceding claims, when said program is run on a processor-based device, a terminal device, a network device, a portable terminal, a consumer electronic device, or a mobile communication enabled terminal According to another aspect of the present invention there is provided a computer program product, comprising program code sections stored on a machine-readable medium for carrying out the operations of a method as above, when said program product is run on a processor-based device, a terminal device, a network device, a portable terminal, a consumer electronic device, or a mobile communication enabled terminal.

According to another aspect of the present invention there is provided a software tool, comprising program portions for carrying out the operations of method as above, when said program is implemented in a computer program for being executed on a processor-based device, a terminal device, a network device, a portable terminal, a consumer electronic device, or a mobile communication enabled terminal.

According to another aspect of the present invention there is provided a computer data signal embodied in a carrier wave and representing instructions, which when executed by a processor cause the operations of anyone of the preceding method claims to be carried out.

According to another aspect of the present invention there is provided a mobile terminal device adapted for sending environmental data, comprising a component for detecting said environmental data; a component for evaluating said environmental data; a component for determining if said evaluated environmental data is to be sent; a component for sending said environmental data in case of an affirmative determination; and a central processing unit CPU adapted for controlling operation of said mobile terminal device, interconnecting said component for detecting, said component for evaluating, said component for determining and said component for sending.

According to an aspect of the present invention there is provided a Mobile terminal device, further comprising a storage component and a user I/O interface, interconnecting said CPU.

According to another aspect of the present invention there is provided a server device adapted for providing processed environmental data, comprising a component for receiving environmental data from a plurality of environmental data providing entities, wherein said environmental data is associated with each of said entities accordingly; a component for processing said received environmental data; a component for providing said processed environmental data; and a central processing unit CPU adapted for controlling operation of said server device, interconnecting said component for receiving, said component for processing and said component for providing.

According to an aspect of the present invention there is provided a server device, further comprising a storage component and a user I/O interface, interconnecting said CPU.

According to another aspect of the present invention there is provided a system for managing environmental data, comprising at least one server device and a plurality of mobile terminal devices as cited above.

According to an aspect of the present invention there is provided a system, wherein said server devices are operated according to a method as cited above.

According to an aspect of the present invention there is provided a system, wherein said mobile terminal devices are operated according to a method as cited above.

Advantages of the present invention will become apparent to the reader of the present invention when reading the detailed description referring to embodiments of the present invention, based on which the inventive concept is easily understandable.

Throughout the detailed description and the accompanying drawings same or similar components, units or devices will be referenced by same reference numerals for clarity purposes.

It shall be noted that the designations portable device, mobile device and portable consumer electronic (CE) are used synonymously throughout the description.

The accompanying drawings are included to provide a further understanding of the invention and are incorporated in and constitute a part of this specification. The drawings illustrate embodiments of the present invention and together with the description serve to explain the principles of the invention. In the drawings, FIG. 1 illustrates a basic system for providing and managing environmental data by means of a plurality of consumer electronic devices in accordance with one embodiment of the present invention;

Figure 1:
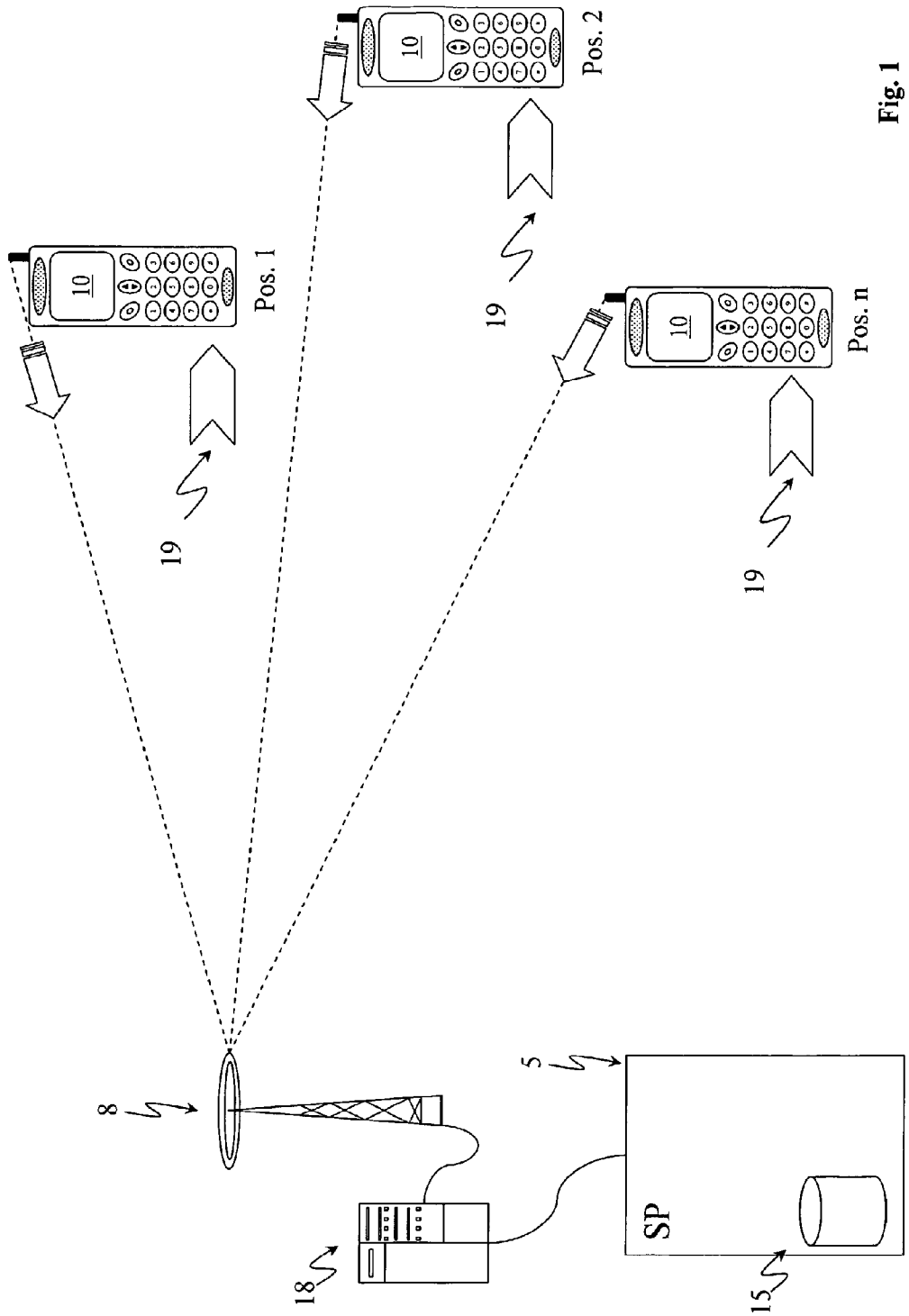

With reference to FIG. 1, a system for providing and managing environmental data by means of a plurality of consumer electronic devices is provided. Each mobile terminal device or consumer electronic 10 is equipped with a wireless data interface for sending and receiving data packets to and from a service provider 5 in form of a server device for instance. Said service provider is equipped with a data storing module for storing the received data, originating from said plurality of mobile terminal devices.

Additionally, each mobile terminal device 10 has a sensor (not depicted) for detecting and preferably recording environmental data 19. These environmental data may comprise humidity, luminance, temperature, position and the like. Said mobile terminal device records the environmental data and it is adapted to evaluate it. The devices are enabled to decide either the data shall be temporarily stored or sent to said service provider 5.

The sending of said environmental data may be provided by means of the wireless data interface by an antenna. The service provider will receive the data by means of its wireless interface 8. Said wireless interface 8 may interconnect a computer system 18, for instance, which is adapted to provide preprocessing of said received data. The computer system may decide if the data is valid or not.

The mobile terminal devices 10 are located at different positions 1 to n and may send or store continuously sensor data. Each mobile device is adapted to decide if the recorded sensor data shall be sent or not. For, instance if the sensor is a rain sensor and if it is raining since 3 hours, it is not necessary to constantly send data to the server 5. It may be sufficient to track the rain front and only if major changes occur, the new, actual data will be sent to said server 5. According to the inventive concept of the present invention, each device is adapted to decide if sensor data may be sent or not. However, large network traffic may be avoided, because each device 10 will send only if required.

All mobile terminal devices due to their different positions are providing a sensor grid, which may be used for weather forecasting or traffic forecasting or the like.

According to an embodiment of the present invention, a sensor subsystem within a mobile terminal measures various physical properties of its environment via sensors. The sensor information is measured over a period of time and is forwarded to the network infrastructure, either to a central server or to distributed infrastructure elements in the vicinity of the terminal (e.g. hot spot access points). In the wireless network the sensor input of various devices is collected and based on this information maps and predictions of the physical properties are computed. The resulting information is delivered to mobile terminals which have registered for this information. Due to the benefits of grid processing (and the high penetration of devices within a city for example) very precise forecasts are possible.

The benefit of the sensor grid system is to enable very precise local forecast of environmental conditions like temperature, humidity, air pressure (relative or absolute), lightning, distance to a rain front and how fast it is approaching, for instance. It is imaginable to implement other senor subsystems within said mobile device 10.

Due to the dependencies between the parameters, the accuracy of the system increases with the number of parameters a mobile device is able to measure. Additional to the parameters mentioned above the mobile device must be able to detect its location precisely.

Furthermore the evaluation of the validity of the measured data, especially temperature and humidity, is crucial for the complete system. For that reason the mobile device 10 has to be able to detect its context (inside a pocket, outside a pocket but inside a building, outside) to decide whether the measured data is valid for the grid processing or not.

The following parameters among others contribute to the context awareness of the mobile device 10: acceleration (detection of walking, running, device orientation, more . . . ), movement direction (compass), temperature, humidity, illumination, light spectrum and time of the day.

It is beneficial not only to utilize the current measurement values, but also recorded data which has been recorded for a certain time period before the actual data. All available sensor data is used by some algorithm to classify the current context of the phone. For instance if temperature, humidity and illumination history indicate that the device is most probable in the pocket or in a building, the temperature and humidity values will not be used for grid processing.

The measurement of sensor data makes most sense if it is running continuously. Therefore the user should only be asked to configure the system, i.e. what kind of sensor data is submitted to a central server and what kind of data from other sources (s)he is subscribing to. The delivered sensor information gets a time stamp for better prediction quality in case of periodic measurements with pauses in between.

The own sensor information is transmitted to a server in the wireless network, either to a central server or to an infrastructure element (e.g. in a hotspot). This transmission can either be done in push mode without the server requesting it explicitly or as a server pull to limit the data traffic. If a user is contributing own data to the central server the retrieval of sensor data from other terminals can be made available cheaper in order to improve the market penetration of the system.

Due to the knowledge of how the data is changing within the grid very exact forecasts are possible. If sensor data is only available at one point in time the development of the property over time is hard to predict. There are many scalar pieces of information which do not reveal their positional changes unless they are measured at various independent positions. An example is e.g. the question about the trajectory of a thunderstorm. From single measurements it is possible to estimate the distance to a lightning, but only when integrating measurements at various places over time the progress of a thunderstorm can be predicted.

For the user the relevance of sensor data is determined by the current or future context of the user, i.e. what she or he is planning to do. A weather forecast is most relevant if it is provided for the planned future location of the user, not the current position. Therefore the user's context information is needed to confine the search for relevant information. In the terminal the user requests and the context are managed by a user agent which sends the sensor data to the network and queries the network for relevant sensor data based on the user context.

Context information can consist (among other information) of terminal position, time, destination of the user at some point in time, the route to the destination, the planned transportation means, the available equipment in the vicinity of the mobile terminal and the overall time planning of the user, i.e. his/her calendar.

Figure 2A:
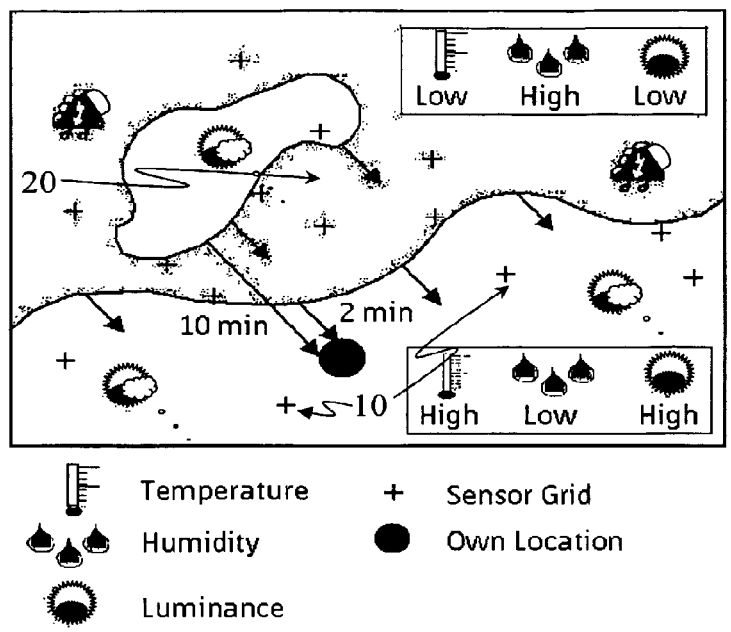
FIG. 2a depicts a scenario of using weather data in accordance with one embodiment of the present invention.

With reference to FIG. 2a a weather forecasting map in accordance with an embodiment of the present invention is depicted. One practical example is the estimation when a rain front will arrive at a certain location. Since humidity data variation shows up in a part of the grid and can be traced over time a very exact forecast is possible. A prediction might be that in 5 minutes it will rain at your current location, but in 10 minutes it will stop again. The user could decide to leave home later to get the next bus.

The user terminal can contribute with measurements associated with the sensor grid like those sketched in FIG. 2a. Those pieces of information allow only very crude extrapolations, but are much more valuable when being sent to a central server, 5, with reference to FIG. 1, which integrates the sensor grid information for better predictions.

The user agent queries the central servers for sensor data from other terminals which are fitting to the context of its own terminal. It is e.g. possible to check the user's calendar for the day, including travelling between different locations and check for weather forecast or other physical data which influence the trip.

Figure 2B:
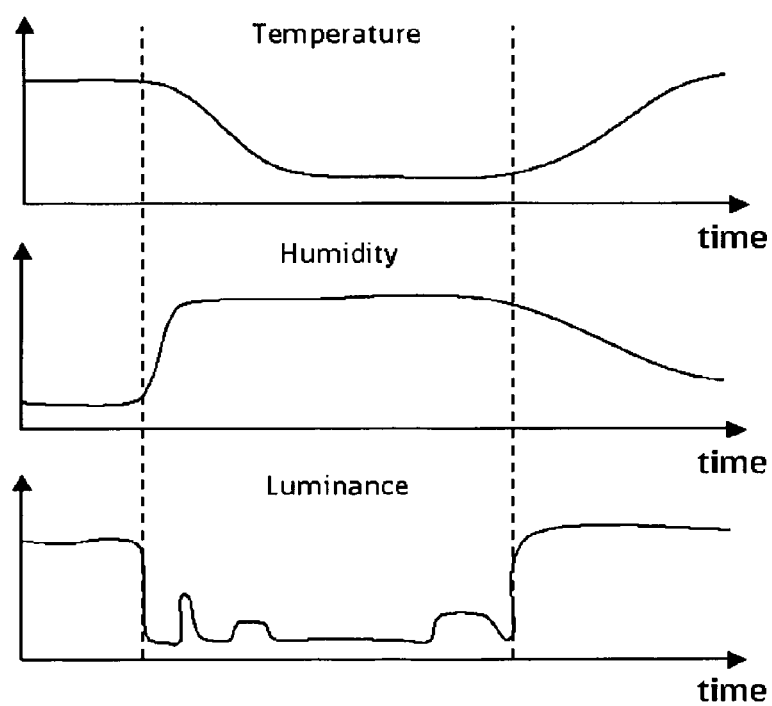
FIG. 2b shows sensed data recorded by a mobile terminal device additionally equipped with an environmental sensor in accordance with one embodiment of the present invention.

The result is a complete weather map like that in FIG. 2b which is generated by the integration of the sensor grid information delivered by the plurality of mobile devices 10 and their corresponding environmental sensor.

Another embodiment may relate to a gaming community for instance. In the mobile gaming context a sensor grid can detect the physical operations of the users e.g. via an acceleration sensor. During the sensor grid creation phase it is possible to label the sensor data to belong to different teams or clans in the game. If the sensor grid data is available separated for the different game player groups the activity and its consistency for the whole group can be evaluated by a game server.

E.g. only teams which have a synchronized behavior are honored or individual players are rewarded if their sensor data remains within bounds (e.g. below a maximum heart rate, but above a minimum heart rate for instance).

Figure 3:
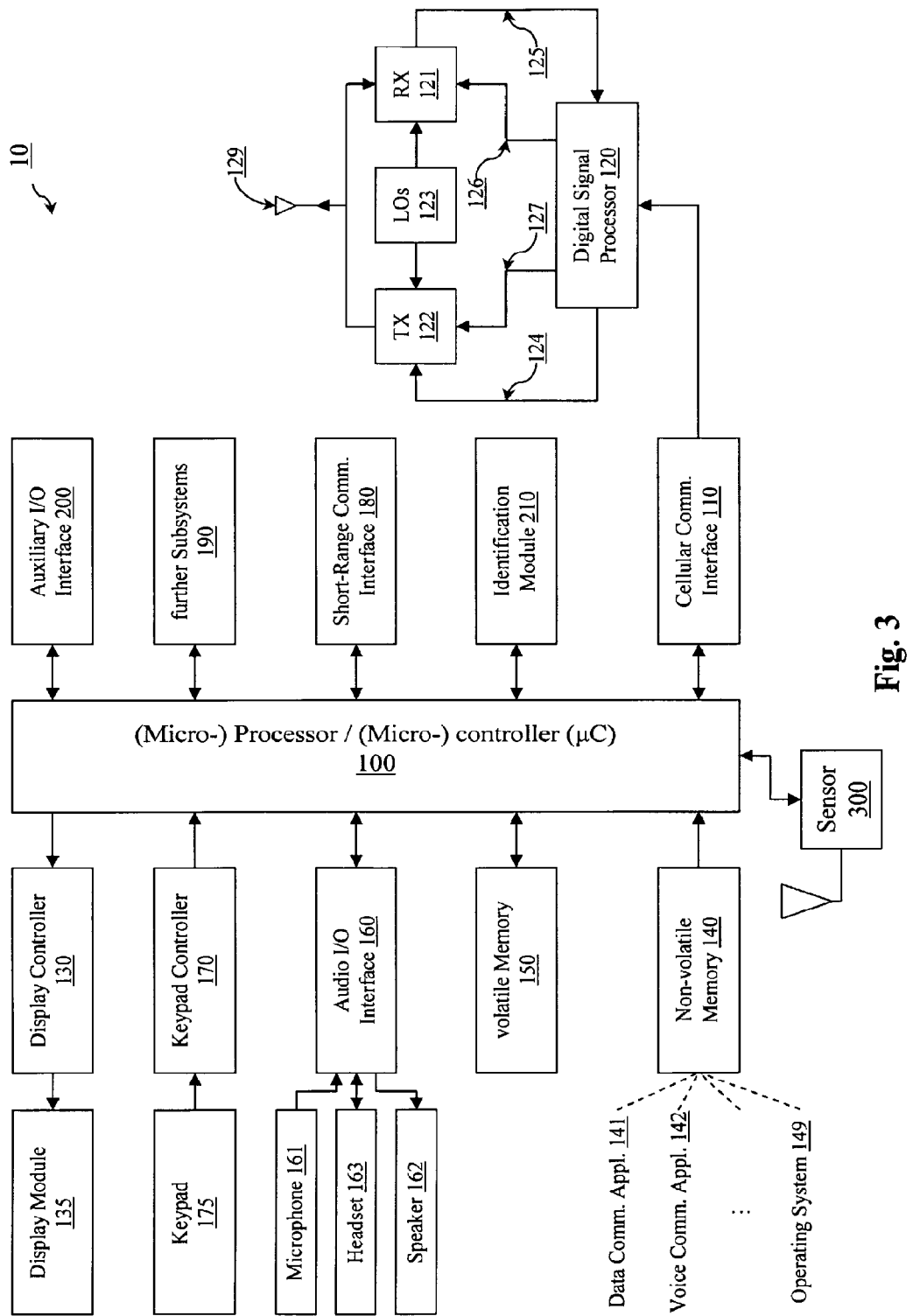
FIG. 3 illustrates schematically an example block diagram for a portable CE device embodied exemplarily on the basis of a cellular terminal device, equipped with a sensor module for detecting and preferably recording environmental data in accordance with one embodiment of the present invention.

FIG. 3 depicts a typical mobile device according to an embodiment of the present invention. The mobile device 10 shown in FIG. 3 is capable for cellular data and voice communications. It should be noted that the present invention is not limited to this specific embodiment, which represents for the way of illustration one embodiment out of a multiplicity of embodiments. The mobile device 10 includes a (main) microprocessor or microcontroller or a central processing unit CPU 100 as well as components associated with the microprocessor controlling the operation of the mobile device.

These components include a display controller 130 connecting to a display module 135, a non-volatile memory 140, a volatile memory 150 such as a random access memory (RAM), an audio input/output (I/O) interface 160 connecting to a microphone 161, a speaker 162 and/or a headset 163, a keypad controller 170 connected to a keypad 175 or keyboard, any auxiliary input/output (I/O) interface 200, and a short-range communications interface 180. Such a device also typically includes other device subsystems shown generally at 190.

Additionally, said mobile terminal device or consumer electronic device, respectively is equipped with a sensor 300, connecting said central processing unit 100. Said sensor is adapted to collect and record environmental conditions data like humidity, light intensity, wind speed, temperature, position altitude etc. A skilled person would appreciate that said sensor may be adapted to sense different environmental data and it is not limited to the above mentioned examples.

The mobile device 10 may communicate over a voice network and/or may likewise communicate over a data network, such as any public land mobile networks (PLMNs) in form of e.g. digital cellular networks, especially GSM (global system for mobile communication) or UMTS (universal mobile telecommunications system). Typically the voice and/or data communication is operated via an air interface, i.e. a cellular communication interface subsystem in cooperation with further components (see above) to a base station (BS) or node B (not shown) being part of a radio access network (RAN) of the infrastructure of the cellular network.

The cellular communication interface subsystem as depicted illustratively with reference to FIG. 1 comprises the cellular interface 110, a digital signal processor (DSP) 120, a receiver (RX) 121, a transmitter (TX) 122, and one or more local oscillators (LOs) 123 and enables the communication with one or more public land mobile networks (PLMNs). The digital signal processor (DSP) 120 sends communication signals 124 to the transmitter (TX) 122 and receives communication signals 125 from the receiver (RX) 121. In addition to processing communication signals, the digital signal processor 120 also provides for receiver control signals 126 and transmitter control signal 127. For example, besides the modulation and demodulation of the signals to be transmitted and signals received, respectively, the gain levels applied to communication signals in the receiver (RX) 121 and transmitter (TX) 122 may be adaptively controlled through automatic gain control algorithms implemented in the digital signal processor (DSP) 120. Other transceiver control algorithms could also be implemented in the digital signal processor (DSP) 120 in order to provide more sophisticated control of the transceiver 122. In case the mobile device 10 communications through the PLMN occur at a single frequency or a closely-spaced set of frequencies, then a single local oscillator (LO) 128 may be used in conjunction with the transmitter (TX) 122 and receiver (RX) 121.

Alternatively, if different frequencies are utilized for voice/data communications or transmission versus reception, then a plurality of local oscillators 128 can be used to generate a plurality of corresponding frequencies. Although the antenna 129 depicted in FIG. 3 or a diversity antenna system (not shown), the mobile device 10 could be used with a single antenna structure for signal reception as well as transmission. Information, which includes both voice and data information, is communicated to and from the cellular interface 110 via a data link between the digital signal processor (DSP) 120. The detailed design of the cellular interface 110, such as frequency band, component selection, power level, etc., will be dependent upon the wireless network in which the mobile device 100 is intended to operate.

After any required network registration or activation procedures, which may involves the subscriber identification module (SIM) 210 required for registration in cellular networks, have been completed, the mobile device 10 may then send and receive communication signals, including both voice and data signals, over the wireless network. Signals received by the antenna 129 from the wireless network are routed to the receiver 121, which provides for such operations as signal amplification, frequency down conversion, filtering, channel selection, and analog to digital conversion. Analog to digital conversion of a received signal allows more complex communication functions, such as digital demodulation and decoding, to be performed using the digital signal processor (DSP) 120. In a similar manner, signals to be transmitted to the network are processed, including modulation and encoding, for example, by the digital signal processor (DSP) 120 and are then provided to the transmitter 122 for digital to analog conversion, frequency up conversion, filtering, amplification, and transmission to the wireless network via the antenna 129.

The microprocessor/microcontroller (μC) 110, which may also designated as a device platform microprocessor, manages the functions of the mobile device 10. Operating system software 149 used by the processor 110 is preferably stored in a persistent store such as the non-volatile memory 140, which may be implemented, for example, as a Flash memory, battery backed-up RAM, any other non-volatile storage technology, or any combination thereof. In addition to the operating system 149, which controls low-level functions as well as (graphical) basic user interface functions of the mobile device 10, the non-volatile memory 140 includes a plurality of high-level software application programs or modules, such as a voice communication software application 142, a data communication software application 141, an organizer module (not shown), or any other type of software module (not shown).

These modules are executed by the processor 100 and provide a high-level interface between a user of the mobile device 10 and the mobile device 10. This interface typically includes a graphical component provided through the display 135 controlled by a display controller 130 and input/output components provided through a keypad 175 connected via a keypad controller 170 to the processor 100, an auxiliary input/output (I/O) interface 200, and/or a short-range (SR) communication interface 180. The auxiliary I/O interface 200 comprise especially USB (universal serial bus) interface, serial interface, MMC (multimedia card) interface and related interface technologies/standards, and any other standardized or proprietary data communication bus technology, whereas the short-range communication interface radio frequency (RF) low-power interface including especially WLAN (wireless local area network) and Bluetooth communication technology or an IRDA (infrared data access) interface.

The RF low-power interface technology referred to herein should especially be understood to include any IEEE 801.xx standard technology, which description is obtainable from the Institute of Electrical and Electronics Engineers. Moreover, the auxiliary I/O interface 200 as well as the short-range communication interface 180 may each represent one or more interfaces supporting one or more input/output interface technologies and communication interface technologies, respectively. The operating system, specific device software applications or modules, or parts thereof, may be temporarily loaded into a volatile store 150 such as a random access memory (typically implemented on the basis of DRAM (direct random access memory) technology for faster operation. Moreover, received communication signals may also be temporarily stored to volatile memory 150, before permanently writing them to a file system located in the non-volatile memory 140 or any mass storage preferably detachably connected via the auxiliary I/O interface for storing data. It should be understood that the components described above represent typical components of a traditional mobile device 10 embodied herein in form of a cellular phone. The present invention is not limited to these specific components and their implementation depicted merely for the way for illustration and sake of completeness.

An exemplary software application module of the mobile device 10 is a personal information manager application providing PDA functionality including typically a contact manager, calendar, a task manager, and the like. Such a personal information manager is executed by the processor 100, may have access to the components of the mobile device 10, and may interact with other software application modules. For instance, interaction with the voice communication software application allows for managing phone calls, voice mails, etc., and interaction with the data communication software application enables for managing SMS (Short Message Service), MMS (Multimedia Message Service), e-mail communications and other data transmissions. The non-volatile memory 140 preferably provides a file system to facilitate permanent storage of data items on the device including particularly calendar entries, contacts etc. The ability for data communication with networks, e.g. via the cellular interface, the short-range communication interface, or the auxiliary I/O interface enables upload, download, synchronization via such networks.

The application modules 141 to 149 represent device functions or software applications that are configured to be executed by the processor 100. In most known mobile devices, a single processor manages and controls the overall operation of the mobile device as well as all device functions and software applications. Such a concept is applicable for today's mobile devices. Especially the implementation of enhanced multimedia functionalities includes for example reproducing of video streaming applications, manipulating of digital images, and video sequences captured by integrated or detachably connected digital camera functionality but also gaming applications with sophisticated graphics drives the requirement of computational power. One way to deal with the requirement for computational power, which has been pursued in the past, solves the problem for increasing computational power by implementing powerful and universal processor cores. Another approach for providing computational power is to implement two or more independent processor cores, which is a well known methodology in the art. The advantages of several independent processor cores can be immediately appreciated by those skilled in the art.

Whereas a universal processor is designed for carrying out a multiplicity of different tasks without specialization to a pre-selection of distinct tasks, a multi-processor arrangement may include one or more universal processors and one or more specialized processors adapted for processing a pre-defined set of tasks. Nevertheless, the implementation of several processors within one device, especially a mobile device such as mobile device 10, requires traditionally a complete and sophisticated re-design of the components.

With reference to FIG. 3, one or more components thereof, e.g. the controllers 130 and 160, the memory components 150 and 140, and one or more of the interfaces 200, 180 and 110, can be integrated together with the processor 100 in a signal chip which forms finally a system-on-a-chip (Soc).

Figure 4B:
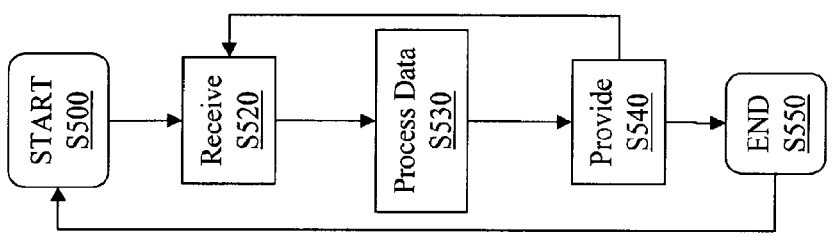
FIG. 4b is an operational sequence of an environmental data providing method in accordance with the present invention.
Figure 4A:
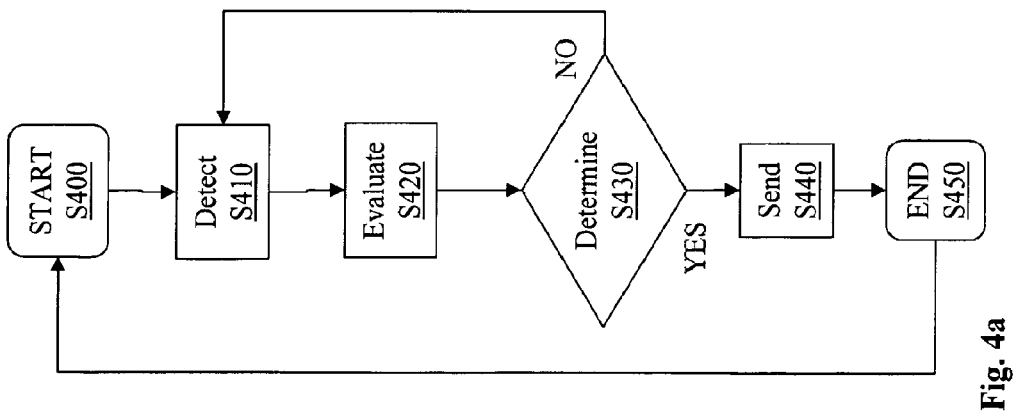
FIG. 4a is an operational sequence of an environmental data sending method in accordance with the present invention.

FIG. 4a shows schematically an operational sequence of a method for sending environmental data in accordance with the present invention. This method may be implemented within a mobile terminal device that is adapted to detect environmental data.

According to an operational step S400 the sequence may start. It is imaginable that said starting within a mobile device may be provided automatically or even as a result of user input for instance. For example, when a user switches on his mobile device said sensor 300, see also FIG. 3, and may start detecting and preferably recording or detecting environmental data. Said detecting is illustrated in accordance with an operation S410, wherein said device starts to detect data like humidity, air pressure or the like. In an operation S420 said detected data will be evaluated within said mobile terminal device 10 to ensure proper further processing. Said device 10 may evaluate if said detected data is valid. For instance, if the device is for instance in a bag it may be unnecessary to evaluate the lightning conditions of that environment.

Afterwards, if the data was evaluated and it is decided that a next operation shall be processed a conditional operation S430 will follow. Said conditional operation S430 determines if the detected environmental data is to be sent or not. Within said determination step S430 the mobile device may compare the evaluated data with predefined threshold values and based on the result it is decided if data shall be sent or not. For instance, if the sensor 300 detects that the temperature remains constant for a predefined time period, said device may not send data because no major changes were detected. Said step is depicted with reference to the NO branch of the conditional operation 430. Thereby, said detecting step 410 will be restarted.

If the device decides that the recorded or detected data is to be sent, YES branch of S430, a sending operation S440 will be processed. Said sending may be done by means of the wireless data interface of said mobile device 10. A sending application within the device 10 will prepare an appropriate message which is sent to a service provider or a server or an certain entity respectively.

If no further data will be received the operational sequence will end in an operation S450 and may be restarted according to a new iteration.

FIG. 4b is an operational sequence of an environmental data providing method in accordance with the present invention. With reference to FIG. 4b said method may be operated on a server side, for instance. Said server is adapted to receive environmental data or messages including environmental data from a plurality of sending entities 10. The operational sequence will start in an operation S500. Said starting may be implemented on an event basis. This means that the operational sequence may start after receiving a first message. Automatically starting is also imaginable and may be provided on a time basis, depending on day time etc.

In a next operation S520 receiving of environmental data from a plurality of sending devices is provided. The server will process the received data corresponding to an operation 530. Said processing may comprise a weather forecasting operation or in general a predictive operation. On the basis of the whole received data from all mobile devices it is possible to create exact and authentic predictions. All mobile devices within the system will act as a sensing grid, delivering different environmental data.

Afterwards, the data may be provided corresponding to an operation S450 and the operational sequence may come to an end, represented by an operation S550. It is imaginable that said sequence will be restarted, corresponding to a new iteration.

Said providing step may comprise sending of the processed environmental data to certain devices. For instance, a mobile device user wishes to receive exact weather forecasting. Said server is now able to provide the subscriber with an exact forecast on the basis of the data which was previously sent by said plurality of mobile terminal devices.

It is obvious for those skilled in the art that as the technology advances, the inventive concept can be implemented in a broad number of ways. The invention and its embodiments are thus not limited to the examples and specific embodiments described above but may vary within the scope of the claims.

What is claimed is:

1. A method comprising:
   determining, at a mobile device, environmental data; and
   causing, at least in part, evaluation of the environmental data to determine whether to transmit the environmental data over a communications link.

2. A method according to claim 1, wherein the environmental data is based on a contextual location of the mobile device.

3. A method according to claim 2, further comprising:
   determining to transmit the environmental data to a server over the communications link.

4. A method according to claim 1, wherein the environmental data is determined using a sensor that is part of the mobile device.

5. A method according to claim 1, wherein the evaluation of the environmental data includes applying statistical operations on the environmental data.

6. A method according to claim 3, wherein the evaluation is based on either at least one predetermined threshold associated with the environmental data, or whether the environmental data is valid for an environmental grid processing.

7. A method according to claim 6, wherein the environmental data is valid for the environmental grid processing if an evaluation of an environmental grid indicates that the mobile device is positioned in an outside environment.

8. A method according to claim 6, wherein the environmental grid is associated with a plurality of mobile devices.

9. A method according to claim 7, wherein the environmental data includes humidity data, temperature data, or a combination thereof; and the determination that the mobile device is positioned in the outside environment is based, at least in part, on the humidity data, the temperature data, or the combination thereof.

10. A method comprising:
receiving environmental data from one or more mobile devices, wherein the environmental data is associated with each mobile device and based, at least in part, on a contextual awareness of the respective mobile devices;
aggregating data based on the received environmental data; and
processing the aggregated data to provide the processed aggregated data to the one or more mobile devices, one or more other devices, or any combination thereof.

11. A method of claim 10, further comprising:
processing the environmental data to determine whether to transmit the environmental data over a communications link.

12. An apparatus comprising:
at least one processor; and
at least one memory including computer program code, the at least one memory and the computer program code configured to, with the at least one processor, cause the apparatus to perform at least the following:
determine, at a mobile device, environmental data, and
evaluate the environmental data to determine whether to transmit the environmental data over a communications link.

13. An apparatus of claim 12, wherein the environmental data is based on a contextual location of the mobile device.

14. An apparatus of claim 13, wherein the apparatus is further caused to:
determine to transmit the environmental data to a server over the communications link.

15. An apparatus of claim 12, wherein the environmental data is determined using a sensor that is part of the mobile device.

16. An apparatus of claim 12, wherein the evaluation of the environmental data includes applying statistical operations on the environmental data.

17. An apparatus of claim 14, wherein the evaluation is based on either at least one predetermined threshold associated with the environmental data, or whether the environmental data is valid for an environmental grid processing.

18. An apparatus of claim 17, wherein the environmental data is valid for the environmental grid processing if an evaluation of an environmental grid indicates that the mobile device is positioned in an outside environment.

19. An apparatus of claim 17, wherein the environmental grid comprises a plurality of mobile devices.

20. An apparatus of claim 18, wherein the environmental data includes humidity data, temperature data, or a combination thereof; and the determination that the mobile device is positioned in the outside environment is based, at least in part, on the humidity data, the temperature data, or the combination thereof.

21. An apparatus comprising:
at least one processor; and
at least one memory including computer program code, the at least one memory and the computer program code configured to, with the at least one processor, cause the apparatus to perform at least the following:
receive environmental data from one or more mobile devices, wherein the environmental data is associated with each of the mobile devices and based, at least in part, on a contextual awareness of the mobile devices,
process the received environmental data, and
provide the processed environmental data to the one or more mobile devices, one or more other devices, or any combination thereof.

22. A system comprising:
a mobile device configured to determine environmental data, and to
evaluate the environmental data to determine whether to transmit the environmental data over a communications link; and
a server configured to communicate with the mobile device over the communications link for selectively receiving the environmental data, and to process the received environmental data.

* * * * *